United States Patent [19]

Hayashi

[11] Patent Number: 4,657,187
[45] Date of Patent: Apr. 14, 1987

[54] ULTRAFINE PARTICLE SPRAYING APPARATUS

[75] Inventor: Chikara Hayashi, Chigasaki, Japan

[73] Assignee: Research Development Corporation of Japan, Tokyo, Japan

[21] Appl. No.: 791,491

[22] Filed: Oct. 25, 1985

[30] Foreign Application Priority Data

Jan. 14, 1985 [JP] Japan ................................. 60-3162

[51] Int. Cl.⁴ .......................... B05B 1/02; B05D 7/24
[52] U.S. Cl. ................................................. 239/556
[58] Field of Search ............... 239/548, 556, 557, 560, 239/561, 565

[56] References Cited

U.S. PATENT DOCUMENTS

| | | | |
|---|---|---|---|
| 1,409,259 | 3/1922 | Sykora | 239/565 |
| 1,883,615 | 10/1932 | Dibble | 239/557 X |
| 3,968,936 | 7/1976 | Brühlmeier | 239/557 X |
| 4,098,462 | 7/1978 | Izaki | 239/557 |

FOREIGN PATENT DOCUMENTS

| | | | |
|---|---|---|---|
| 594104 | 3/1960 | Canada | 239/548 |
| 59-87077 | 5/1984 | Japan . | |

*Primary Examiner*—Andres Kashnikow
*Attorney, Agent, or Firm*—Armstrong, Nikaido, Marmelstein & Kubovcik

[57] ABSTRACT

Apparatus for spraying ultrafine particles includes a nozzle in which two or more nozzle pipes for directing the ultrafine particles onto an objective surface are bundled together.

4 Claims, 11 Drawing Figures

FIG.1(A) FIG.2(A)
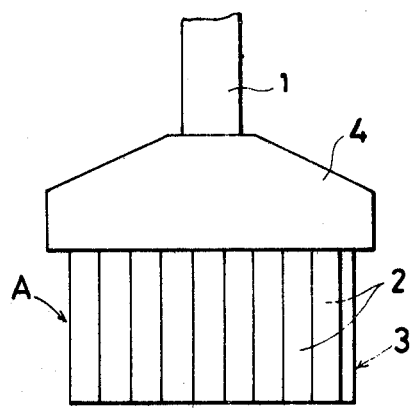
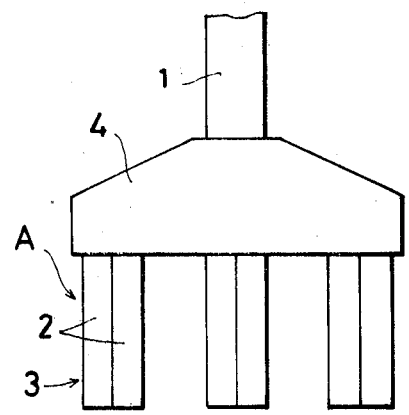
FIG.1(B) FIG.2(B)
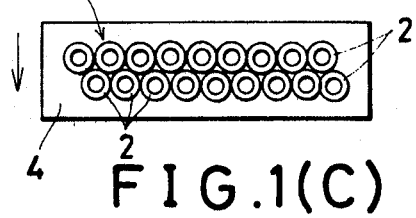
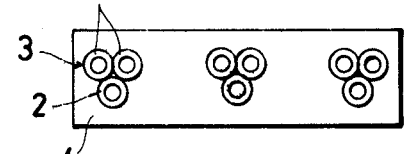
FIG.1(C) FIG.2(C)
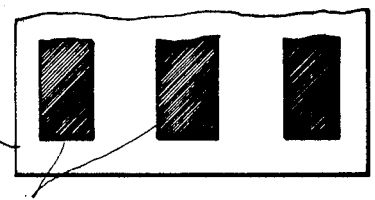
FIG.3(A) FIG.3(B)
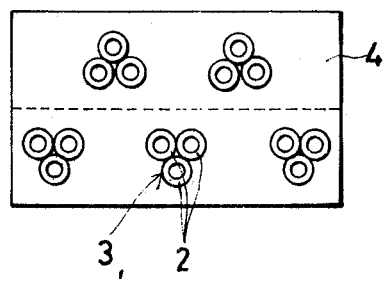
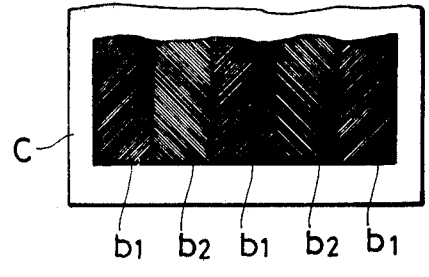

ULTRAFINE PARTICLE SPRAYING APPARATUS

BACKGROUND OF THE INVENTION

1. Field of the Invention

This invention relates to an ultrafine particle spraying apparatus suitable for forming a predetermined pattern or covering film on a surface of a predetermined article of metal, resin or the like.

2. Description of the Prior Art

As apparatus for spraying ultrafine particles, there is known an apparatus, as disclosed in Japanese patent application Sho No. 57-196085 filed by the applicant of this application, wherein innumerable ultrafine particles are conveyed under pressure by a carrier gas through a conveying pipe, and are sprayed onto a predetermined objective surface through a single nozzle pipe provided on a forward end of the conveying pipe. With this apparatus there may be formed a predetermined adhesion deposit of the ultrafine particles in the form of a point, line, surface, or the like.

This conventional apparatus, however, is such that when the ultrafine particles are sprayed onto the objective surface through the single nozzle pipe to form a line, the ultrafine particles are caused to strike against the objective surface and adhere thereto by the force of their own inertia while the carrier gas tends to spread outwardly and disperse. Accordingly, if the nozzle pipe is made large in caliber, i.e., internal diameter, since the carrier gas flows toward the circumference of the nozzle pipe, the ultrafine particles are liable to be scattered by a fringe flow of the carrier gas, and accordingly an outline of the drawn line tends to become blurred. Therefore, in general, the nozzle pipe to be used is preferably smaller than 1 mm in caliber and is usually 0.2-0.6 mm in caliber.

A distinct line can be drawn by the use of a nozzle pipe of such a proper caliber, but for drawing a thick line or a striped pattern comprising thick lines that are larger than 1 mm in width it is necessary to repeat the drawing procedure such that, after a single line is drawn by the nozzle, the nozzle is shifted laterally and is moved linearly along the preceding drawn line with or without leaving space. Additionally, it takes a long time and is troublesome in working and low in efficiency to form a covering film extending over almost the whole surface of an objective surface, and it is difficult in this case to obtain a film of uniform thickness. Thus, the conventional apparatus has various inconveniences as described above.

The present invention has as an object, therefore, to provide an apparatus for spraying ultrafine particles which is free from the foregoing inconveniences and which can draw a thick line or a striped pattern comprising thick lines or a complete covering film or the like on an objective surface with the ultrafine particles at a high efficiency.

SUMMARY OF THE INVENTION

According to the present invention, nozzle means comprising at least two nozzles contiguous to each other, i.e., bundled together, are provided in an apparatus having means for conveying ultrafine particles in a carrier gas under pressure and spraying the ultrafine particles onto a predetermined objective surface whereby the particles adhere to and deposit on the surface to form a desired pattern.

BRIEF DESCRIPTION OF THE DRAWINGS

FIG. 1A is a side view of one embodiment of the apparatus of the present invention.

FIG. 1B is a front view of the apparatus of FIG. 1A.

FIG. 1C is a top plan view of part of a film formed by the apparatus of FIG. 1A.

FIG. 2A is a side view of a second embodiment of the apparatus of the present invention.

FIG. 2B is a front view of the apparatus of FIG. 2A.

FIG. 2C is a top plan view of part of a film formed by the apparatus of FIG. 2A.

FIG. 3A is a front view of another embodiment of the apparatus of the present invention.

FIG. 3B is a top plan view of part of a film formed by the apparatus of FIG. 3A.

DETAILED DESCRIPTION

Figure 4:
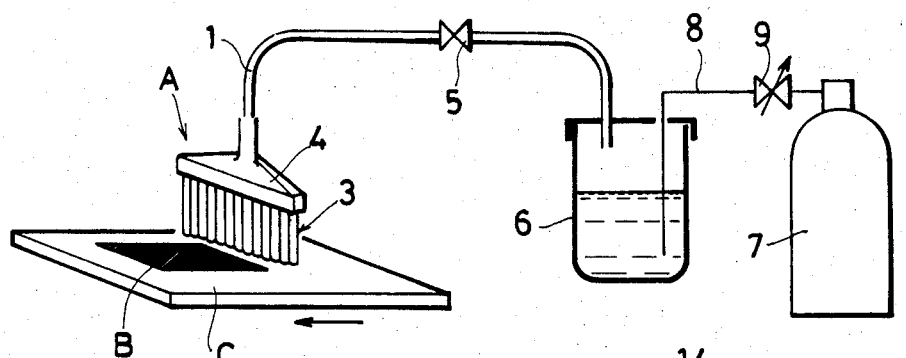
FIGS. 4, 5 and 6 show different film forming apparatus each having the nozzle means according to the present invention.

The apparatus according to the present invention is used for spraying ultrafine particles of the type known in the art for forming adhering films on a predetermined objective surface. Such particles include, for example, particles of inorganic materials such as metals and metal alloys, and oxides, nitrides and carbides thereof; ceramic particles; particles of organic materials such as synthetic resins and the like, etc., and usually have a particle diameter of from 10–1000 A.

Embodiments of the apparatus according to the present invention for spraying ultrafine particles are described below in conjunction with the accompanying drawings.

FIGS. 1A and 1B show one embodiment of this invention. Referring to these figures, the apparatus A includes a conveying pipe 1 connected to a container (not shown) for a mixture of ultrafine particles and a carrier gas for the same, and a pressure pump (not shown) for supplying the mixture under pressure. The conveying pipe 1 is provided on its forward end with a bundle-shaped nozzle means 3 comprising a plurality of nozzle pipes 2, 2 . . . bundled together, i.e., contiguous to or closely adjacent to one another. A flat-shaped distribution base portion 4 connects the bundle-shaped nozzle means 3 to the forward end of the conveying pipe 1.

In a preferred embodiment each nozzle pipe 2 is a stainless steel tubular member of 1 mm in outer diameter and 0.5 mm in caliber (inner diameter). The bundled arrangement is such that front and rear rows, each comprising nine nozzle pipes lined up laterally without any space between adjacent nozzle pipes, are staggered in position laterally with respect to each other to form bundle-shaped nozzle means 3 of 9.5 mm in width from end to end.

If apparatus A is operated so that ultrafine particles are sprayed through the conveying pipe 1 onto the surface of an objective member C as shown in FIG. 1(C), while the objective member C such as a glass plate or the like located therebelow is being moved in the direction of the arrow, there can be drawn in a single stroke a band-shaped film B of the ultrafine particles 9 mm in width and having a precise, distinct, outline as shown in FIG. 1C.

FIGS. 2A and 2B show another embodiment of this invention. The bundle-shaped nozzle means 3 comprises three nozzle pipes 2 bundled together in a triangular form. Three groups thereof are disposed laterally at regular intervals on the base portion 4. By this arrangement, a striped pattern comprising three thick line films a of the ultrafine particles as shown in FIG. 2C an be formed in a single stroke.

FIG. 3A shows a modification of the embodiment shown in FIGS. 2A and 2b. The bundle-shaped nozzle means 3 comprises three nozzle pipes 2 bundled together in a triangular form. Three bundles are disposed laterally at regular intervals to form a front row, and an additional two bundles are disposed correspondingly to the respective intervals between the adjacent three bundles forming the front row so as to form a rear row. If, when this nozzle apparatus is to be used, the interior of the conveying pipe 1 is divided into front and rear sections and, for example, metallic ultrafine particles and ceramic ultrafine particles are sprayed simultaneously onto the objective surface through the rear section and the front section, respectively, there can be formed respective striped patterns comprising three, wide, metallic line films $b_1$ and two, wide, ceramic films $b_2$ disposed alternately to one another, as shown in FIG. 3B.

Next, a film forming apparatus provided with the ultrafine particle spraying means of the present invention will be explained with reference to FIG. 4.

FIG. 4 shows an example of the use of ultrafine particle spraying apparatus of the invention having the bundle-shaped nozzle means 3 shown in FIG. 1. Conveying pipe 1 of 5 mm in internal diameter extending rearwards from the base portion 4 of the apparatus A is connected, through a control valve 5, to a container 6 containing a mixture of ultrafine particles and a carrier gas. The container 6 is, in turn, connected through a conduit pipe 8 to a hydrogen source 7, e.g., a pressurized bomb. Numeral 9 denotes a control valve interposed in the conduit pipe 8. The container 6 is previously charged with a proper amount of Ni ultrafine particles.

The operation of the film forming apparatus thus constructed is as follows:

Hydrogen gas flows into the container 6 from the hydrogen bomb 7 under a predetermined pressure and at a flow rate of 0.2 l/sec., and thereby the Ni ultrafine particle mass is fluidized so that there is formed a mixture thereof. The mixture is carried through the conveying pipe 1 at a flow rate of the carrier gas of 10 m/sec. and is introduced into the distribution base portion 4 for being distributed thereby and is propelled, or projected, through the forward end of bundle-shaped nozzle means 3. The flow rate of the mixture is increased to 50 m/sec. in each nozzle pipe 2. The ultrafine particles vigorously jetted from the nozzle pipes 2 adhere to an objective substrate C such as a glass plate or the like which is provided below the bundle-shaped nozzle means 3 and is moved in one direction relative to the nozzle means and forms a broad Ni ultrafine particle deposit film B having the same width as the bundle-shaped nozzle means 3. In this case, for example, the gap between the forward end of the nozzle means 3 and the surface of the substrate C is set to be 1.5 mm. If the substrate C is moved at a speed of 0.5 mm/sec. from the beginning of the spraying, there is formed an Ni film of 9 mm in width and 4 mm in thickness. This film can be obtained simply by the spraying work, in such a state that the same is firmly adhered to the surface of the substrate and is 50% in density.

The spraying apparatus A of the foregoing film forming apparatus can also be used in a manner such that the bundle-shaped nozzle means 3 is replaced with the bundle-shaped nozzle means of the kind shown in FIG. 2 or FIG. 3. Of course, apparatus A can also be used with any desired bundle-shaped nozzle means designed in accordance with this invention, although not specifically illustrated in the drawings. Such a modification can be also considered such that two film forming apparatus are used, and accordingly, two kinds of the bundle-shaped nozzles means of this invention are used jointly.

Figure 5:
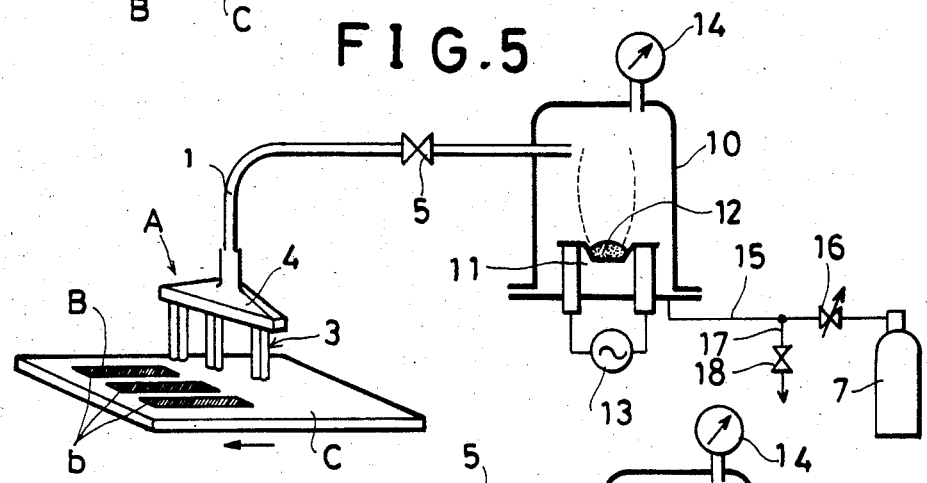

FIG. 5 illustrates an embodiment wherein the spraying apparatus A shown in FIG. 2 is used for forming a striped pattern film on the surface of the substrate C. In this case, ultrafine particles immediately after being produced by a vacuum vapor deposition apparatus are sprayed through the spraying apparatus A to form the striped pattern film thereof. Namely, instead of spraying the ultrafine particles previously prepared and charged into the container 6 as described in conjunction with FIG. 4, the base end portion of the conveying pipe 1 is connected to an ultrafine particle generating chamber 10. A heating container 11 contains a raw material 12 such as Ni or the like to be evaporated, which is heated by an electric source 13 and pressure is measured by a pressure gauge 14. The generating chamber 10 is connected to a conduit pipe 15, and a base end portion of the pipe 15 is connected through a control valve 16 to a carrier gas bomb 7 of, for example, hydrogen gas. A pipe 17 which diverges from the conduit pipe 15 is connected through a control valve 18 to a vacuum pump (not illustrated) for evacuating the chamber 10.

In the operation of the apparatus shown in FIG. 5, air in the generating chamber 10 is first removed by the vacuum pump, and thereafter the vacuum pump is stopped and the valve 18 is closed. Then, the raw material 12 comprising a metallic block, for instance, is heated and evaporated by the heating electric source 13. Under this condition, the valve 16 of the gas bomb 7 of reducing or inert gas such as hydrogen, argon gas, etc. is opened for charging the gas under pressure into the generating chamber 10. Thereby, the generated innumerable ultrafine particles are mixed with and conveyed by the gas through the interior of the conveying pipe 1 at a gas flow rate of 0.2 /sec., and thereby the same is sprayed through the three groups of the bundle-shaped nozzle means 3 of this invention onto the surface of the objective member located therebelow and moved at a speed of 0.5 mm/sec. Thus, there can be formed in a single movement of the objective member a covering film B comprising three tape-shaped ultrafine particle covering films b, b, b corresponding to three bundles, or groups, of the bundle-shaped nozzle means 3.

Figure 6:
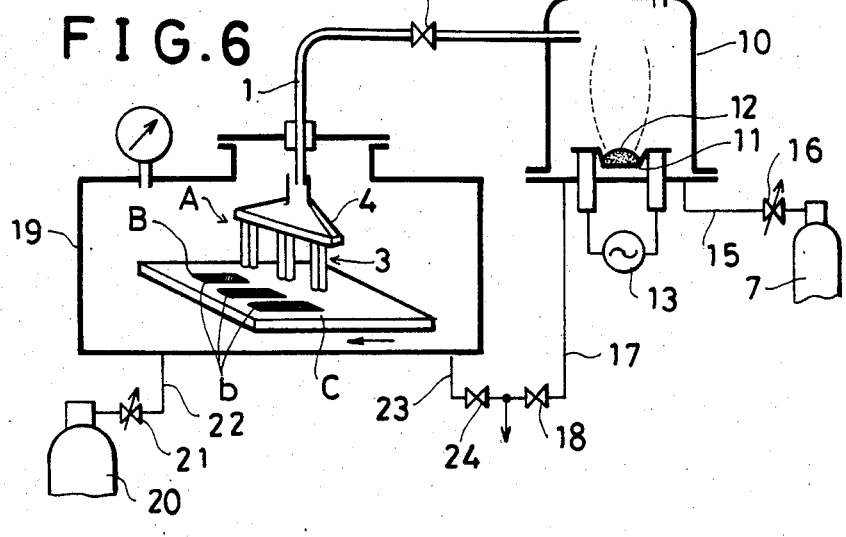

FIG. 6 shows a covering film forming apparatus for forming a covering film in a vacuum atmosphere, instead of forming the film in the external air as in the example of FIG. 5. Vacuum forming chamber 19 contains therein the invention apparatus A. A gas bomb 20 is connected to the forming chamber 19 for supplying gas such as hydrogen, argon or the like into the chamber 19 as occasion demands via control valve 21 and connecting pipe 22. A conduit pipe 23 extends from the forming chamber 19 and is connected to a vacuum pump (not illustrated) via a valve 24 interposed in the conduit pipe 23.

By the operation of this arrangement, the interior of the vacuum forming chamber 19 is maintained at 3 Torr, for example, and the interior of the ultrafine particle generating chamber 10 is maintained, for example, at 15.5 Torr. Thus, the sprayed ultrafine particles are not exposed to the external air and are adhered to the objective surface for forming a predetermined pattern of covering film.

Thus, according to the present invention, an ultrafine particle spraying nozzle means is formed into a bundle-shaped nozzle means comprising a plurality of nozzle pipes bundled together or otherwise contiguous to or closely adjacent to each other, so that a thick line with a precise outline or a surface-shaped deposit of the ultrafine particles can be formed, by spraying thereof, on an objective surface rapidly and at a high efficiency. The caliber of the nozzle pipes of the nozzle means of the apparatus of the present invention is not particularly restricted but is preferably less than 1 mm and, more preferably, 0.2–0.6 mm.

What is claimed is:

1. An ultrafine particle spraying apparatus comprising means for producing ultrafine particles; a nozzle means for spraying said ultrafine particles onto a surface in film of a desired pattern and for depositing said particles on and adherinig said particles to said surface in said desired pattern, said nozzle means comprising at least two nozzle pipes bundled together; and a converying means for conveying said ultrafine particles under pressure from said means for producing ultrafine particles to said nozzle means.

2. The apparatus of claim 1 wherein said nozzle means comprises a plurality of groups of nozzle pipes, each of said groups comprising at least two nozzle pipes bundled together.

3. The apparatus of claim 1 wherein said nozzle pipes have a caliber of less than 1 mm.

4. The aplparatus of claim 3, wherein the caliber is 0.2–0.6 mm.

* * * * *